United States Patent
Wei-Wen et al.

(10) Patent No.: US 9,128,609 B2
(45) Date of Patent: Sep. 8, 2015

(54) TOUCH INTERPRETIVE ARCHITECTURE AND TOUCH INTERPRETIVE METHOD BY USING MULTI-FINGERS GESTURE TO TRIGGER APPLICATION PROGRAM

(75) Inventors: Yang Wei-Wen, Taipei (TW); Cheng Chien-Wei, Taipei (TW)

(73) Assignee: ELAN MICROELECTRONICS CORP., Hsinchu (TW)

(*) Notice: Subject to any disclaimer, the term of this patent is extended or adjusted under 35 U.S.C. 154(b) by 1498 days.

(21) Appl. No.: 12/108,638

(22) Filed: Apr. 24, 2008

(65) Prior Publication Data

US 2009/0184933 A1     Jul. 23, 2009

(30) Foreign Application Priority Data

Jan. 23, 2008   (TW) ............................... 097102753 A

(51) Int. Cl.
- *G06F 3/033* (2013.01)
- *G06F 3/0488* (2013.01)
- *G06F 3/0481* (2013.01)

(52) U.S. Cl.
CPC .......... *G06F 3/04886* (2013.01); *G06F 3/0488* (2013.01); *G06F 3/04817* (2013.01)

(58) Field of Classification Search
CPC .............................. G06F 3/04817; G06F 3/048
USPC .......................................... 715/863; 345/173
See application file for complete search history.

(56) References Cited

U.S. PATENT DOCUMENTS

| | | | | |
|---|---|---|---|---|
| 5,357,473 A * | 10/1994 | Mizuno et al. | ................ | 365/201 |
| 5,825,352 A * | 10/1998 | Bisset et al. | ................... | 345/173 |
| 6,522,422 B1 * | 2/2003 | Klingler et al. | .............. | 358/1.15 |
| 6,803,906 B1 * | 10/2004 | Morrison et al. | ............. | 345/173 |
| 7,523,179 B1 * | 4/2009 | Chu et al. | ....................... | 709/222 |
| 2004/0061724 A1 * | 4/2004 | Sato | ............................ | 345/810 |
| 2005/0057524 A1 * | 3/2005 | Hill et al. | ....................... | 345/173 |
| 2006/0253793 A1 * | 11/2006 | Zhai et al. | ..................... | 715/773 |
| 2007/0180444 A1 * | 8/2007 | Hoover et al. | ................ | 717/168 |
| 2009/0100129 A1 * | 4/2009 | Vigil et al. | ..................... | 709/203 |
| 2009/0128500 A1 * | 5/2009 | Sinclair | ......................... | 345/173 |
| 2009/0128516 A1 * | 5/2009 | Rimon et al. | ................. | 345/174 |

* cited by examiner

*Primary Examiner* — Angie Badawi

(74) *Attorney, Agent, or Firm* — Muncy, Geissler, Olds & Lowe, P.C.

(57) ABSTRACT

This invention is related to a touch interpretive architecture of multi-fingers gesture to trigger an application program and a touch interpretive method thereof used in the same for interpreting a multi-fingers gesture applied to a touch pad and then acquiring some hot-key messages of at least an application program so as to trigger the application program according to the hot-key messages.

8 Claims, 3 Drawing Sheets

TOUCH INTERPRETIVE ARCHITECTURE AND TOUCH INTERPRETIVE METHOD BY USING MULTI-FINGERS GESTURE TO TRIGGER APPLICATION PROGRAM

FIELD OF THE INVENTION

The present invention relates to a touch interpretive architecture and a touch interpretive method, and more particularly to a touch interpretive architecture and a touch interpretive method by using multi-fingers gesture to trigger an application program.

BACKGROUND OF THE INVENTION

Conventionally, by simply touching the surface of the touch input interface with a single finger, the user can make selections and move a cursor. In combination with several keys, the functions of the conventional mouse are substantially replaced.

Nowadays, with increasing demand of using the touch input interface as a control unit, the use of the touch pad to replace mice or keypads is not satisfied. That is, the behaviors (e.g. movement amount, movement direction, rotation amount or rotation direction) of a software object (e.g. a volume control object or a picture) can be controlled by touching the surface of the touch input interface with a single-gesture operation (e.g. a movement, rotation or tapping operation).

Nowadays, touch input interfaces operated with at least two fingers have been disclosed. It is possible to zoom in and out of web pages or photos by placing two fingers on the touch sensing interface and spreading them farther apart or closer together, as if stretching or squeezing the image. However, there are still some drawbacks with a multi-fingers gesture operation. For example, the recognizing speed and the cost of the multi-fingers gesture operation are compromised.

The method of efficiently and speedily recognizing the multi-fingers gestures touching on the touch pad has been disclosed in a co-pending application. Therefore, the present invention is directed to quickly interpret the multi-fingers gesture operation message so as to control execution of a plug-in application program of the operation system (e.g. the package software such as ACDSee, Acrobat or MS Office). Conventionally, the touch pad can only control the cursor but fails to directly control execution of the plug-in application program. For directly controlling execution of the application program, the hardware region of the touch input interface should have some function keys triggered to change the operating modes. These conventional methods, however, are time-consuming and not user-friendly.

Therefore, there is a need of providing a touch interpretive architecture and a touch interpretive method by using multi-fingers gesture to trigger an application program to obviate the drawbacks encountered from the prior art.

SUMMARY OF THE INVENTION

It is an object of the present invention to provide a touch interpretive architecture by using multi-fingers gesture to trigger an application program.

Another object of the present invention provides a touch interpretive method by using multi-fingers gesture to trigger an application program.

In accordance with an aspect of the present invention, there is provided a touch interpretive architecture by using multi-fingers gesture to trigger an application program. The touch interpretive architecture includes a control unit, a system call unit and an interpreter unit. The control unit is communicated with a touch input interface for receiving a trigger signal packet generated when a multi-fingers gesture operation is performed through the touch input interface, and generating a driving control signal in response to the trigger signal packet. The trigger signal packet includes at least one multi-fingers gesture operation message. The system call unit is communicated with the control unit for generating a system call instruction in response to the driving control signal. The interpreter unit is communicated with the system call unit for retrieving a hot-key message corresponding to the multi-fingers gesture operation message from a hot-key database in response to the system call instruction, and outputting an application program control packet including the hot-key message to a system, so that a software object of an application program is triggered according to the application program control packet to result in a corresponding behavior.

In an embodiment, the touch input interface includes a touch pad and a signal interface circuit.

In an embodiment, the touch input interface further includes a cursor control rod and a key, and the trigger signal packet includes a cursor control message and a key control message.

In an embodiment, the control unit includes a driver executed for controlling an instruction set of the touch input interface.

In an embodiment, the multi-fingers gesture operation includes a multi-fingers movement operation, a multi-fingers rotation operation, a multi-fingers zoom in/out operation or a multi-fingers tapping operation.

In an embodiment, the system call unit includes a system interface and control module having a plurality of system call instructions.

In an embodiment, the interpreter unit includes an interpreting program and an interpreting interface and control module served as an interface of the interpreting program.

In an embodiment, the hot-key database contains a plurality of hot-key messages corresponding to different hot-key functions of the application program.

In an embodiment, the system is an operation system, and the control unit and the system call unit belong to a kernel module layer of the operation system.

In an embodiment, the system is an operation system, and the interpreter unit and the application program belong to a user module layer of the operation system.

In an embodiment, the application program is a plug-in package software of the system.

In accordance with another aspect of the present invention, there is provided a touch interpretive method by using multi-fingers gesture to trigger an application program. First of all, a trigger signal packet is generated from a touch input interface to a control unit when a multi-fingers gesture operation is performed through the touch input interface. The trigger signal packet includes at least one multi-fingers gesture operation message. In response to the trigger signal packet, a driving control signal is generated from the control unit to a system call unit. In response to the driving control signal, a system call instruction is generated from the system call unit to an interpreter unit. In response to the system call instruction, the interpreter unit retrieves a hot-key message corresponding to the multi-fingers gesture operation message from a hot-key database. An application program control packet including the hot-key message is outputted to a system, so that a software object of an application program is triggered according to the application program control packet to result in a corresponding behavior.

In accordance with another aspect of the present invention, there is also provided a touch interpretive method by using multi-fingers gesture to trigger an application program, said touch interpretive method comprising steps of: performing a multi-fingers gesture operation and detecting a sequence of at least one multi-fingers gesture through a touch input interface to generate at least one multi-fingers gesture operation message; generating a trigger signal packet from said touch input interface to a control unit, wherein said trigger signal packet includes said at least one multi-fingers gesture operation message; generating a driving control signal from said control unit to a system call unit in response to said trigger signal packet; generating a system call instruction from said system call unit to an interpreter unit in response to said driving control signal; allowing said interpreter unit to retrieve a hot-key message corresponding to said multi-fingers gesture operation message from a hot-key database in response to said system call instruction; and outputting an application program control packet including said hot-key message to a system, so that a software object of an application program is triggered according to said application program control packet to result in a corresponding behavior.

In an embodiment, said touch input interface includes a touch pad and a signal interface circuit.

In an embodiment, said at least one multi-fingers gesture operation message is an indication of the simultaneous presence of at least one multi-fingers gesture and wherein the step of detecting a sequence of said at least one multi-fingers gesture further comprises steps of: scanning a touch sensor of said touch pad to identify a first maxima in a signal corresponding to a first finger gesture, identify a minima following the first maxima and identify a second maxima in a signal corresponding to a second finger gesture following said minima; and providing said indication of the simultaneous presence of the simultaneous presence of two finger gestures in response to identification of said first and second maxima.

In an embodiment, the touch interpretive method further including the step of causing a pointing device click function to occur in response to the detection of at least a second maxima, or further including the step of enabling a "drag" function to occur in response to the detection of at least a second maxima, or further including the step of enabling a "select" function in response to the detection of at least a second maxima, or further including the step of enabling an "link" function in response to the detection of at least a second maxima.

In accordance with another aspect of the present invention, there is also provided a touch interpretive method by using multi-fingers gesture to trigger an application program, said touch interpretive method comprising steps of: performing a multi-fingers gesture operation through a touch input interface to generate at least one multi-fingers gesture operation message, wherein said touch input interface includes a touch pad and a signal interface circuit, and wherein said at least one multi-fingers gesture operation message is an indication of the simultaneous presence of at least one multi-fingers gesture and further comprises steps of scanning a touch sensor of said touch pad to identify a first maxima in a signal corresponding to a first finger gesture, identify a minima following the first maxima and identity a second maxima in a signal corresponding to a second finger gesture following said minima; and providing said indication of the simultaneous presence of the simultaneous presence of two finger gestures in response to identification of said first and second maxima; generating a trigger signal packet from said touch input interface to a control unit, wherein said trigger signal packet includes said at least one multi-fingers gesture operation message; generating a driving control signal from said control unit to a system call unit in response to said trigger signal packet; generating a system call instruction from said system call unit to an interpreter unit in response to said driving control signal; allowing said interpreter unit to retrieve a hot-key message corresponding to said multi-fingers gesture operation message from a hot-key database in response to said system call instruction; and outputting an application program control packet including said hot-key message to a system, so that a software object of an application program is triggered according to said application program control packet to result in a corresponding behavior.

In an embodiment, the touch interpretive method further including the step of causing a pointing device click function to occur in response to the detection of at least a second maxima, or further including the step of enabling a "drag" function to occur in response to the detection of at least a second maxima, or further including the step of enabling a "select" function in response to the detection of at least a second maxima, or further including the step of enabling an "ink" function in response to the detection of at least a second maxima.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
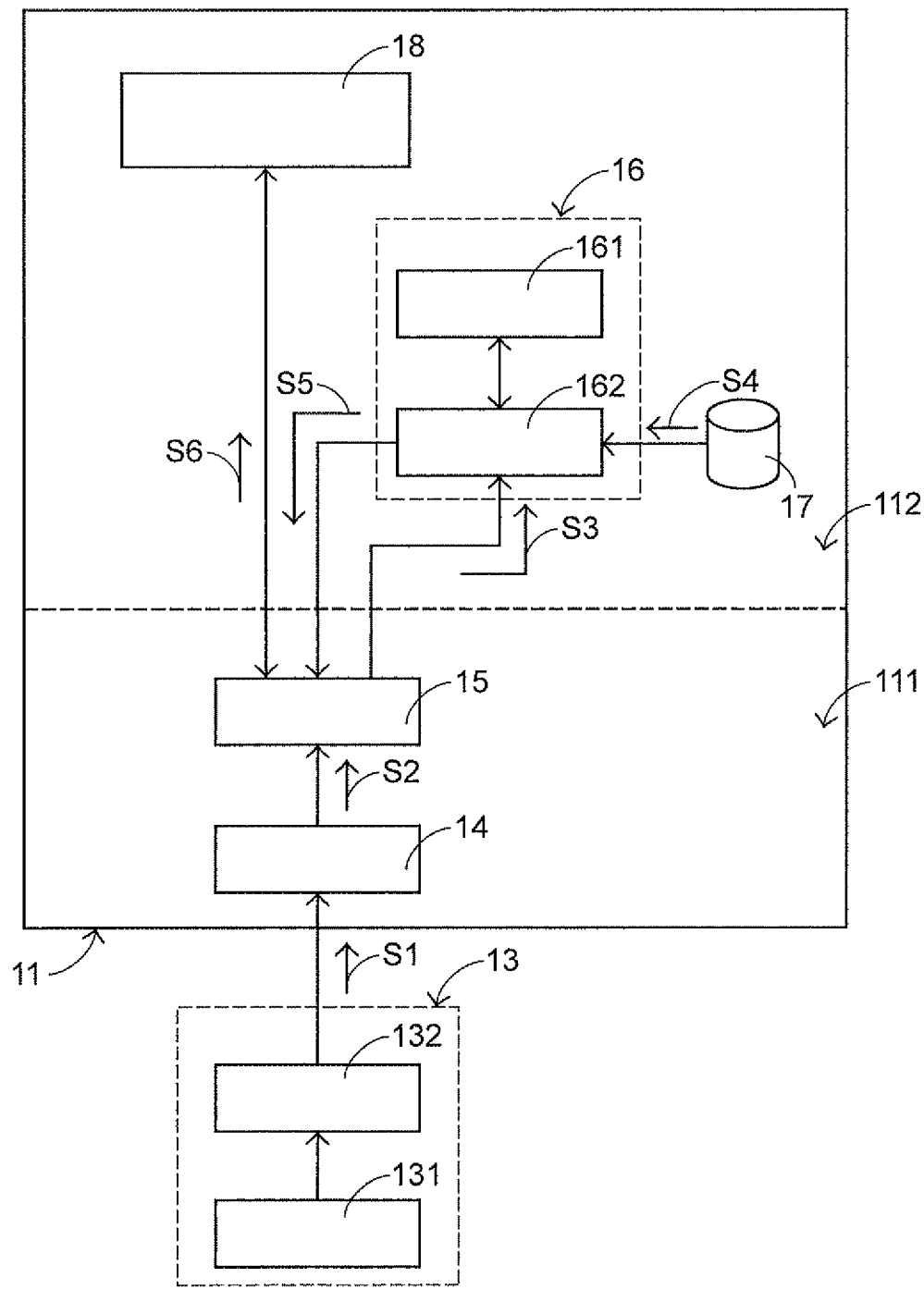
FIG. 1 is a schematic block diagram of a touch interpretive architecture by using multi-fingers gesture to trigger an application program according to a preferred embodiment of the present invention.

Referring to FIG. 1, a schematic block diagram of a touch interpretive architecture by using multi-fingers gesture to trigger an application program according to a preferred embodiment of the present invention is illustrated.

The touch interpretive architecture 11 of FIG. 1 principally includes a touch input interface 13, a control unit 14, a system call unit 15, an interpreter unit 16, a hot-key database 17 and an application program 18.

The touch input interface 13 includes a touch pad 131 and a signal interface circuit 132. Perfectly, the touch pad 131 has a touch sensor (not shown). The signal interface circuit 132 is for example a PCI (Peripheral Component Interconnect) signal interface. For executing the functions of conventional mice and/or conventional keypads, the touch input interface 13 can further include a cursor control rod and a key (not shown). The operation principles of the cursor control rod and the key are known in the art, and are not redundantly described herein.

The control unit 14 includes a driver executed for controlling an instruction set of the touch input interface 13. The system call unit 15 includes a system interface and control module having a plurality of system call instructions. The interpreter unit 16 includes an interpreting program 161 and an interpreting interface and control module 162. The interpreting interface and control module 162 is for example an APT module, which is served as an interface of the interpreting program 161. The hot-key database 17 contains a plurality of hot-key messages corresponding to different hot-key functions of the application programs 18. In this embodiment, the application program 18 is a plug-in package software of the operation system 11.

Take the application program 18 as Adobe Acrobat package software for example. For performing zoom in/out operations by the Adobe Acrobat package software 18, the hot-key message ("Ctrl+M") associated with the zoom in/out operations needs to be pre-stored in the hot-key database 17. By retrieving such a hot-key message from the hot-key database 17, the interpretive result of a corresponding multi-fingers gesture operation is obtained. The multi-fingers gesture operation used herein indicates a multi-fingers movement operation, a multi-fingers rotation operation, a multi-fingers zoom in/out operation or a multi-fingers tapping operation.

Please refer to FIG. 1 again. The control unit 14 and the system call unit 15 belong to the kernel module layer 111 of the operation system 11. The interpreter unit 16 and the application program 18 belong to the user module layer 112 of the operation system 11.

Hereinafter, an operation principle of the touch interpretive architecture according to the present invention will be illustrated with reference to FIG. 1.

The control unit 14 is communicated with the touch input interface 13 for receiving a trigger signal packet S1, including at least one multi-fingers gesture operation message, generated when a multi-fingers gesture operation is performed and a sequence thereof is detected through the touch input interface 13. In response to the trigger signal packet S1, a driving control signal S2 is generated. As previously described above, the touch input interface 13 includes the cursor control rod and the key. Correspondingly, the trigger signal packet S1 includes a cursor control message and a key control message. In the driving control signal S2, a variety of messages included in the trigger signal packet S1 (e.g. the multi-fingers gesture operation message, the cursor control message and a key control message) are screened and recognized.

For example, the above-mentioned multi-fingers gesture operation message is an indication of the simultaneous presence of the at least one multi-fingers gesture and the detection of a sequence of the at least one multi-fingers gesture further comprises steps of (not shown):

scanning the touch sensor of the touch pad 131 to identify a first maxima in a signal corresponding to a first finger gesture, identify a minima following the first maxima and identify a second maxima in a signal corresponding to a second finger gesture following said minima; and providing the indication of the simultaneous presence of the simultaneous presence of two finger gestures in response to identification of said first and second maxima, wherein further including the step of causing a pointing device click function to occur in response to the detection of at least a second maxima, or further including the step of enabling a "drag" function to occur in response to the detection of at least a second maxima, or further including the step of enabling a "select" function in response to the detection of at least a second maxima, or further including the step of enabling an "link" function in response to the detection of at least a second maxima.

The system call unit 15 is communicated with the control unit 14. In response to the driving control signal S2, a system call instruction S3 is generated. The interpreter unit 16 is communicated with the system call unit 15. In response to the system call instruction S3, the interpretive results of corresponding multi-fingers gesture operation are obtained. The multi-fingers gesture operation used herein indicates a multi-fingers movement operation, a multi-fingers rotation operation, a multi-fingers zoom in/out operation or a multi-fingers tapping operation. According to the obtained interpretive result, a corresponding hot-key message S4 is retrieved from the hot-key database 17 and an application program control packet S5 including the hot-key message S4 is asserted to the operation system 11. In response to the application program control packet S5, a behavior control instruction S6 is generated from the operation system 11 to trigger a software object of the application program 18 to result in a corresponding behavior.

Figure 2:
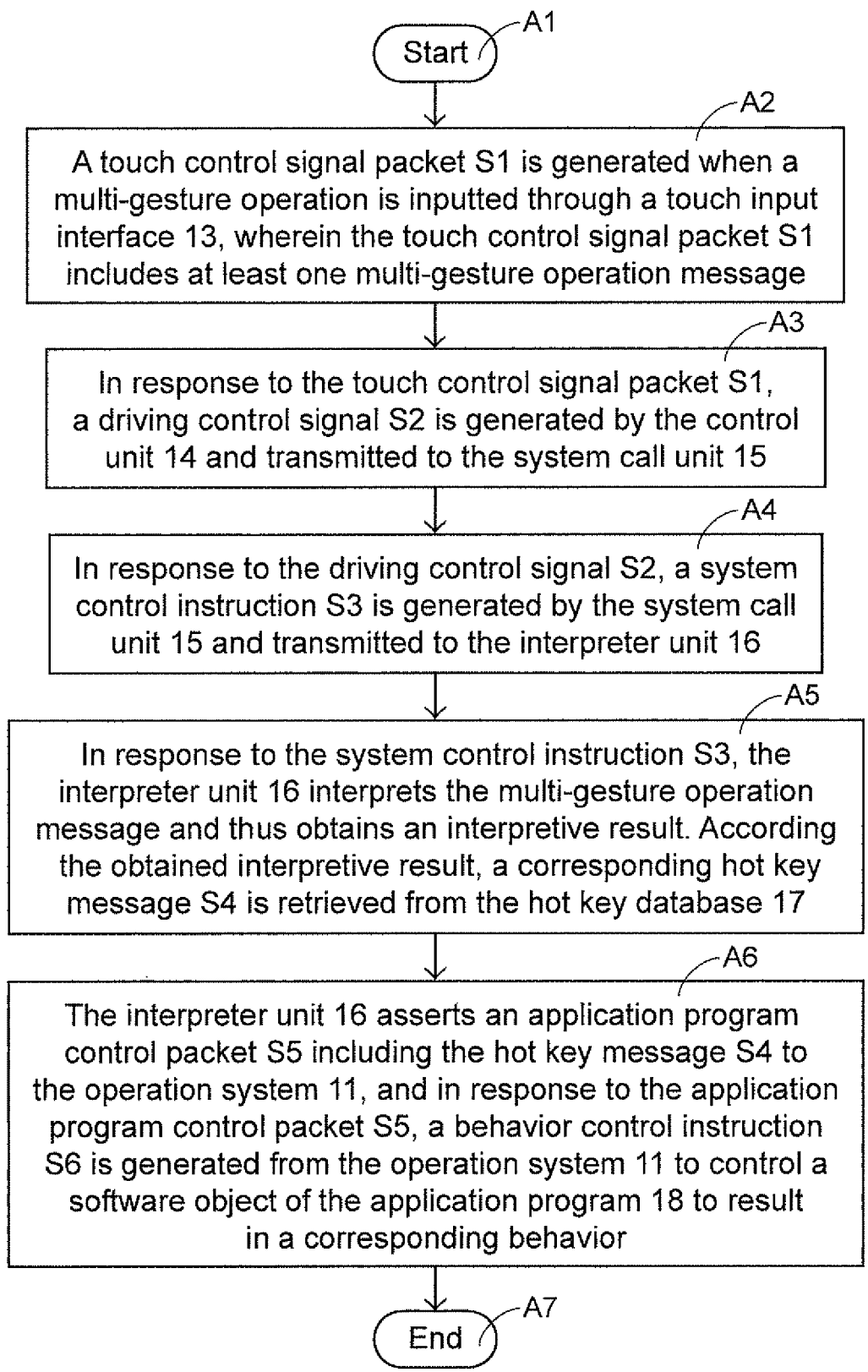
FIG. 2 schematically illustrates a flowchart of a touch interpretive method according to the present invention.

A touch interpretive method of the present invention will be illustrated as follows with reference to a flowchart of FIG. 2.

After the touch interpretive method is started (Step A1), a trigger signal packet S1 is generated when a multi-fingers gesture operation is performed through the touch input interface 13, wherein the trigger signal packet S1 includes at least one multi-fingers gesture operation message (Step A2). In response to the trigger signal packet S1, a driving control signal S2 is generated by the control unit 14 and transmitted to the system call unit 15 (Step A3). In response to the driving control signal S2, a system call instruction S3 is generated by the system call unit 15 and transmitted to the interpreter unit 16 (Step A4). In response to the system call instruction S3, the interpreter unit 16 interprets the multi-fingers gesture operation message and thus obtains an interpretive result. According to the obtained interpretive result, a corresponding hot-key message S4 is retrieved from the hot-key database 17 (Step A5). Next, the interpreter unit 16 asserts an application program control packet S5 including the hot-key message S4 to the operation system 1, and in response to the application program control packet S5, a behavior control instruction S6 is generated from the operation system 11 to trigger a software object of the application program 18 to result in a corresponding behavior (Step A6).

Hereinafter, three implementation examples of interpreting a multi-fingers gesture operation will be illustrated with reference to FIG. 3A, FIG. 3B and FIG. 5C.

Figure 3A:
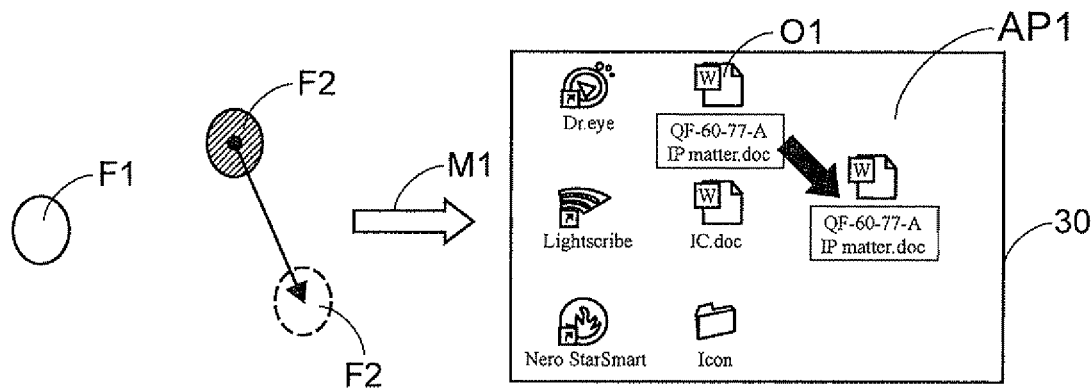
FIG. 3A, FIG. 3B and FIG. 3C schematically illustrate three implementation examples of interpreting a multi-fingers gesture operation.

As shown in FIG. 3A, the first finger F1 and the second finger F2 are placed on the touch pad 131 for implementing a multi-fingers gesture operation M1. The multi-fingers gesture operation M1 indicates that the first finger F1 is fixed on a touch point but the second finger F2 is shifted from one touch point to another touch point. By the touch interpretive architecture and the touch interpretive method of the present invention, a software object O1 of an application program 18 (e.g. a desk-top program AP1) shown on a computer screen 30 is simultaneously shifted from one position to another position so as to interpret the multi-fingers gesture operation M1.

Figure 3B:
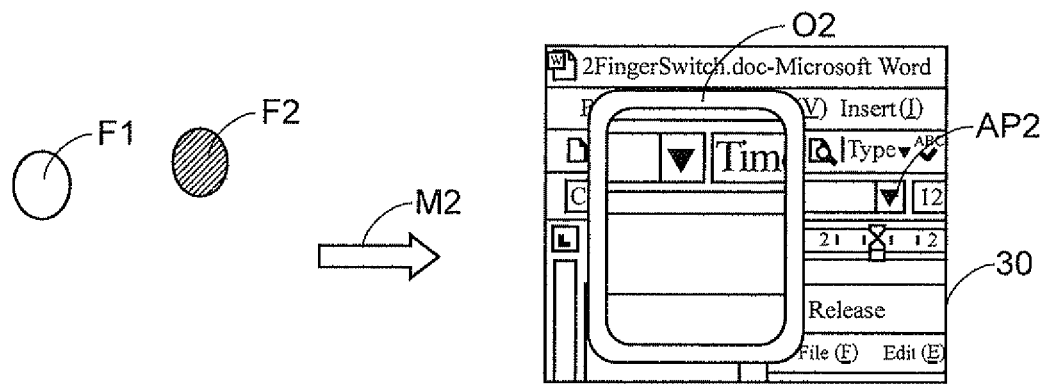

As shown in FIG. 3B, the first finger F1 and the second finger F2 are placed on the touch pad 131 for implementing a multi-fingers gesture operation M2. The multi-fingers gesture operation M2 indicates that the first finger F1 is fixed on a touch point but the second finger F2 is tapping on another touch point. By the touch interpretive architecture and the touch interpretive method of the present invention, a software object O2 of an application program 18 (e.g. a package software AP2) shown on a computer screen 30 is simultaneously zoomed in, thereby interpreting the multi-fingers gesture operation M2. For preventing erroneous judgment, two or more tapping actions are applicable. In addition, the zoom-in software object is embodied as a superposed magnifier as shown in FIG. 3B.

Figure 3C:
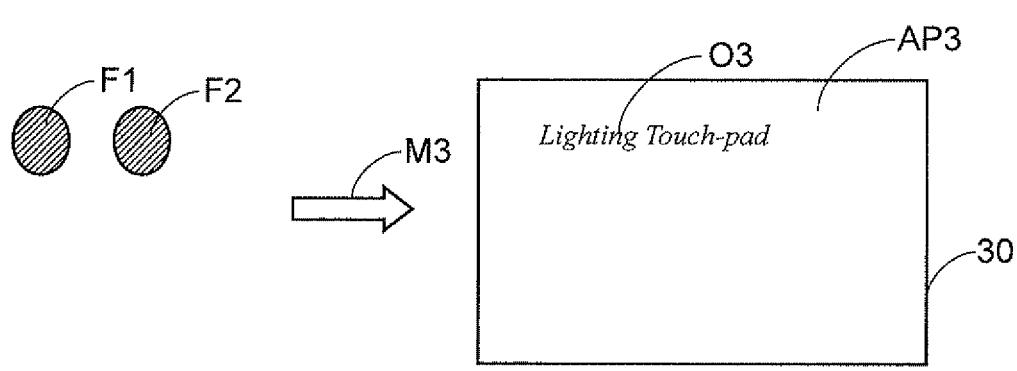

As shown in FIG. 3C, the first finger F1 and the second finger F2 are placed on the touch pad 131 for implementing a multi-fingers gesture operation M3. The multi-fingers gesture operation M3 indicates that both of the first finger F1 and the second finger F2 perform a double tapping operation on the touch pad 131 so as to turn on a LED lamp (not shown) on the backside plate of the touch pad 131. Under this circumstance, a text message O3 (which is also a software object) of an application program 18 (e.g. a background software AP3) is simultaneously shown on a computer screen 30 to indicate that the LED lamp has been turned on.

From the above description, the touch interpretive architecture and the touch interpretive method of the present invention can directly control a software object of an application program by utilizing the interpretive result of the multi-fingers gesture operation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multitouch contact responsive system comprising:
   a touch input interface comprising a touch pad configured to generate a multi-finger gesture operation message in response to a multi-finger gesture performed on the touch pad, the touch pad including a touch sensor;
   a hot-key database having multiple pre-stored hot-key messages corresponding to different hot-key functions of an application software program; and
   an interpreter unit for interpreting the multi-finger gesture operation message to obtain an interpretive result, retrieving one of the hot-key messages from the hot-key database based on the interpretive result, and outputting an application program control packet including the one of the hot-key messages to an operation system;
   wherein the hot-key database and the interpreter unit are in the operation system;
   wherein in response to the application program control packet, a behavior control instruction is generated from the operation system to trigger a software object of the application software program to result in a corresponding behavior.

2. The system as claimed in claim 1 further comprising:
   a control unit communicating with the touch input interface for receiving the multi-finger gesture operation message, the control unit adapted to output a driving control signal in response to the multi-finger gesture operation message, wherein the control unit includes a driver executed for controlling an instruction set of the touch input interface; and a system call unit communicating with the control unit for generating a system call instruction in response to the driving control signal.

3. The system as claimed in claim 1, wherein the multi-finger gesture includes a multi-fingers movement operation, a multi-finger rotation operation, a multi-fingers zoom in/out operation or a multi-fingers tapping operation.

4. The system as claimed in claim 2, wherein the system call unit includes a system interface and control module having a plurality of system calls.

5. The system as claimed in claim 1, wherein the interpreter unit comprises: an interpreting program; and an interpreting interface and control module serving as an interface of the interpreting program.

6. A multitouch contact responsive method to control the operation of an application software program, the method comprising steps of:
   generating a multi-finger gesture operation message based on a multi-finger gesture performed on a touch pad;
   providing a hot-key database having multiple pre-stored hot-key messages corresponding to different hot-key functions of an application software program;
   interpreting the multi-finger gesture operation message to obtain an interpretive result;
   retrieving one of the multiple hot-key messages from the hot-key database based on the interpretive result; and
   outputting an application program control packet including the one of the hot-key message to an operation system,
   wherein the hot-key database is in an operation system, and
   wherein in response to the application program control packet, a behavior control instruction is generated from the operation system to trigger a software object of the application software program to result in a corresponding behavior.

7. The method as claimed in claim 6, wherein the multi-finger gesture includes a multi-fingers movement operation, a multi-finger rotation operation, a multi-fingers zoom in/out operation or a multi-fingers tapping operation.

8. The method as claimed in claim 6, further comprising:
pre-storing the multiple hot-key messages in the hot-key database before the steps of generating, interpreting, retrieving and triggering.

* * * * *